(12) United States Patent
Kishi et al.

(10) Patent No.: US 8,800,296 B2
(45) Date of Patent: Aug. 12, 2014

(54) GAS TURBINE CONTROL METHOD AND GAS TURBINE POWER GENERATING APPARATUS

(75) Inventors: Makoto Kishi, Hyogo (JP); Akihiko Saito, Hyogo (JP); Takashi Sonoda, Hyogo (JP); Shinsuke Nakamura, Hyogo (JP); Sosuke Nakamura, Hyogo (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 1015 days.

(21) Appl. No.: 12/746,579

(22) PCT Filed: Dec. 11, 2008

(86) PCT No.: PCT/JP2008/072572
§ 371 (c)(1),
(2), (4) Date: Jul. 14, 2010

(87) PCT Pub. No.: WO2009/075335
PCT Pub. Date: Jun. 18, 2009

(65) Prior Publication Data
US 2010/0269515 A1    Oct. 28, 2010

(30) Foreign Application Priority Data
Dec. 13, 2007    (JP) .................................. 2007-322279

(51) Int. Cl.
*F02C 9/28* (2006.01)
(52) U.S. Cl.
USPC .................. 60/773; 60/776; 60/790; 60/793; 60/39.76; 60/39.281

(58) Field of Classification Search
USPC ........... 60/773, 776, 790, 793, 39.76, 39.281, 60/746
See application file for complete search history.

(56) References Cited

U.S. PATENT DOCUMENTS 4,321,791 A * 3/1982 Carroll ............................ 60/790
4,378,673 A * 4/1983 Abo et al. ....................... 60/790
(Continued)

FOREIGN PATENT DOCUMENTS

CN    1971013 A    5/2007
JP    6-101502 A    4/1994
(Continued)

OTHER PUBLICATIONS

International Search Report of PCT/JP2008/072572, Mailing Date of Jan. 20, 2009.
(Continued)

*Primary Examiner* — Phutthiwat Wongwian
*Assistant Examiner* — Michael B Mantyla
(74) *Attorney, Agent, or Firm* — Westerman, Hattori, Daniels & Adrian, LLP

(57) ABSTRACT

An object is to reduce a fluctuation in the gas-turbine output in a nozzle switching period. In the nozzle switching period during which a first nozzle group that has been used is switched to a second nozzle group that is going to be used, the amounts of fuel supplied through the first nozzle group and the second nozzle group are adjusted by using at least one adjustment parameter registered in advance, the adjustment parameter registered in advance is updated according to the operating condition of the gas turbine, and the updated adjustment parameter is registered as an adjustment parameter to be used next.

10 Claims, 18 Drawing Sheets

(56) References Cited

U.S. PATENT DOCUMENTS

| | | | | |
|---|---|---|---|---|
| 4,672,806 A | * | 6/1987 | Pisano | 60/773 |
| 4,716,719 A | * | 1/1988 | Takahashi et al. | 60/773 |
| 4,735,052 A | | 4/1988 | Maeda et al. | |
| 4,993,221 A | * | 2/1991 | Idelchik | 60/773 |
| 5,303,541 A | * | 4/1994 | Goff et al. | 60/773 |
| 5,325,660 A | * | 7/1994 | Taniguchi et al. | 60/776 |
| 6,230,479 B1 | * | 5/2001 | Kawamura et al. | 60/773 |
| 6,289,274 B1 | * | 9/2001 | Martucci et al. | 701/100 |
| 7,051,533 B2 | * | 5/2006 | Baino et al. | 60/773 |
| 7,188,465 B2 | * | 3/2007 | Kothnur et al. | 60/39.281 |
| 2005/0274115 A1 | * | 12/2005 | Pearce | 60/773 |
| 2006/0218929 A1 | | 10/2006 | Murakami | |
| 2007/0089395 A1 | | 4/2007 | Fujii et al. | |
| 2007/0113560 A1 | | 5/2007 | Steber et al. | |

FOREIGN PATENT DOCUMENTS

| | | |
|---|---|---|
| JP | 7-269373 A | 10/1995 |
| JP | 8-178290 A | 7/1996 |
| JP | 8-312377 A | 11/1996 |
| JP | 11-141354 A | 5/1999 |
| JP | 2002-038972 A | 2/2002 |
| JP | 2002-138856 A | 5/2002 |
| JP | 2005-195014 A | 7/2005 |
| JP | 2006-152818 A | 6/2006 |
| JP | 2006-283714 A | 10/2006 |
| JP | 2007-077866 A | 3/2007 |

OTHER PUBLICATIONS

Korean Notice of Allowance dated Jul. 6, 2012, issued in corresponding Korean Patent Application No. 10-2010-072572, with English translation (3 pages).

Koean Office Action dated May 11, 2012, issued in corresponding Koean Patent Application No. 10-2010-7012284 (5 pages).

European Search Report dated Jul. 11, 2013, issued in corresponding Application No. 08859039.3 (6 pages).

Korean Notice of Allowance dated Aug. 31, 2012, issued in corresponding Korean Patent Application No. 10-2010-7012284, with English translation (3 pages).

The Decision to Grant a Patent has been received in corresponding Chinese Patent Application No. 200880119564.X dated Jan. 23, 2014, (2 pages).

* cited by examiner

GAS TURBINE CONTROL METHOD AND GAS TURBINE POWER GENERATING APPARATUS

TECHNICAL FIELD

The present invention relates to a gas turbine control method and a gas turbine power generating apparatus.

BACKGROUND ART

A combustor of a gas turbine has a pilot nozzle and a plurality of main nozzles. As shown in FIG. 22, the main nozzles are divided into a nozzle group A and a nozzle group B, for example. The number of nozzles constituting the nozzle group A is set smaller than the number of nozzles constituting the nozzle group B.

In such a combustor, the nozzle groups used for fuel supply are switched according to the load on the gas turbine. For example, Japanese Unexamined Patent Application, Publication No. Hei-8-312377 discloses a technology in which nozzle groups are smoothly switched by controlling the amounts of fuel supplied to the respective nozzle groups in a nozzle switching period. Specifically, as shown in FIG. 23, when the nozzle group A is switched to the nozzle group B, control is carried out so that the amount of fuel supplied to the nozzle group B is increased, and the amount of fuel supplied to the nozzle group A is reduced by that increased fuel amount. In other words, in the nozzle switching period, the amounts of fuel supplied to the respective nozzle groups are adjusted such that the sum of the amount of fuel supplied to the nozzle group A and the amount of fuel supplied to the nozzle group B becomes constant.

Patent Citation 1:
Japanese Unexamined Patent Application, Publication No. Hei-8-312377

DISCLOSURE OF INVENTION

However, in the invention disclosed in Japanese Unexamined Patent Application, Publication No. Hei-8-312377, there is a problem in that the gas-turbine output fluctuates in the nozzle switching period, as shown in FIG. 24, because a fluctuation in combustion efficiency is not taken into account.

The present invention has been made to solve the above-described problem, and an object thereof is to provide a gas turbine control method and a gas turbine power generating apparatus capable of reducing a fluctuation in the gas-turbine output in the nozzle switching period.

In order to solve the above-described problem, the present invention employs the following solutions.

According to a first aspect, the present invention provides a gas turbine control method for a gas turbine that includes a combustor and a plurality of nozzle groups having different numbers of nozzles and supplying fuel gas to the combustor and that switches the nozzle groups used for fuel supply according to an operating condition, the method including the steps of: adjusting the amounts of fuel supplied through a first nozzle group and a second nozzle group by using at least one adjustment parameter registered in advance in a nozzle switching period, during which a first nozzle group that has been used is switched to a second nozzle group that is going to be used; updating the adjustment parameter registered in advance, according to the operating condition of the gas turbine; and registering the updated adjustment parameter as an adjustment parameter to be used next.

According to this aspect, every time nozzle switching is performed, the adjustment parameter is updated according to the operating condition of the gas turbine at that time and is registered for next nozzle switching. In this way, the adjustment parameter is updated every time nozzle switching is performed, thereby making it possible to bring the adjustment parameter close to a more appropriate value. Thus, the operation of the gas turbine at the time of nozzle switching can be stabilized.

In the above-described gas turbine control method, in the nozzle switching period, the amount of fuel supplied through the first nozzle group may be gradually reduced, the amount of fuel supplied through the second nozzle group may be gradually increased, and the total amount of fuel supplied to the combustor may be increased by a predetermined amount to be more than a total fuel-supply amount command value.

In the nozzle switching period, since the amount of fuel supplied to the combustor is increased to be more than the fuel-supply amount command value, a reduction in the combustion efficiency in the combustor can be suppressed. As a result, a fluctuation in the gas-turbine output or the gas-turbine rotation speed at the time of nozzle switching can be reduced.

In the above-described gas turbine control method, the adjustment parameter may be updated based on information about a gas-turbine output or a gas-turbine rotation speed.

In the above-described gas turbine control method, whether to permit update of the adjustment parameter may be determined based on the operating condition of the gas turbine, and update registration of the adjustment parameter may be performed based on the determination result.

In this way, it is determined whether to permit update of the adjustment parameter, thereby making it possible to update the adjustment parameter only when necessary. Thus, it is possible to avoid unnecessary updating performed when the adjustment parameter is set to an appropriate value.

In the above-described gas turbine control method, one of the adjustment parameters is, for example, a first adjustment parameter that is used to determine a decrease start timing for the amount of fuel supplied through the first nozzle group in the nozzle switching period.

The decrease start timing for the amount of fuel supplied through the first nozzle group is adjusted using the first adjustment parameter, thereby making it possible to adjust the amount of fuel supply at the beginning of the nozzle switching period to a more appropriate amount. Thus, a fluctuation in the gas-turbine output at the beginning of the nozzle switching period can be reduced.

In the above-described gas turbine control method, one of the adjustment parameters is, for example, a second adjustment parameter that is used to determine a rate of increase for the amount of fuel supplied through at least one of the first nozzle group and the second nozzle group.

The rate of increase for the amount of fuel supplied through at least one of the first nozzle group and the second nozzle group is adjusted using the second adjustment parameter, thereby making it possible to adjust the amount of fuel supply at the end of the nozzle switching period to a more appropriate amount. Thus, a fluctuation in the gas-turbine output at the end of the nozzle switching period can be reduced.

In the above-described gas turbine control method, one of the adjustment parameters is, for example, a third adjustment parameter that is used to determine at least one of a rate of change of increase for the amount of fuel supplied through the second nozzle group and a rate of change of decrease for the amount of fuel supplied through the first nozzle group.

At least one of the rate of change of increase for the amount of fuel supplied through the second nozzle group and the rate of change of decrease for the amount of fuel supplied through the first nozzle group is adjusted using the third adjustment parameter, thereby making it possible to adjust the amount of fuel supply at the middle of the nozzle switching period to a more appropriate amount. Thus, a fluctuation in the gas-turbine output at the middle of the nozzle switching period can be reduced.

In the above-described gas turbine control method, when there are a plurality of adjustment parameters, the nozzle switching period may be divided into a plurality of time periods according to the properties of the adjustment parameters, the adjustment parameters may be respectively allocated to the time periods, and each of the adjustment parameters may be updated according to the behavior of the gas turbine in the time period to which it is allocated.

Thus, each adjustment parameter can be updated according to the behavior of the gas turbine in the time period during which fuel adjustment using the adjustment parameter effectively functions. As a result, the adjustment parameter can be more effectively updated.

In the above-described gas turbine control method, the adjustment parameter may be updated based on at least one of atmospheric conditions, start-up conditions, power-plant operating conditions, and power-plant operational states, in the nozzle switching period, and the updated adjustment parameter may be registered as an adjustment parameter to be used next.

In this way, when the adjustment parameter is updated based on at least one of the atmospheric conditions, the start-up conditions, the power-plant operating conditions, and the power-plant operational states, a more appropriate adjustment parameter can be set.

According to a second aspect, the present invention provides a gas turbine power generating apparatus that includes a combustor and a plurality of nozzle groups having different numbers of nozzles and supplying fuel gas to the combustor and that switches the nozzle groups used for fuel supply according to an operating condition, including: a parameter setting section that has an adjustment parameter for adjusting the amounts of fuel supplied to the first nozzle group and the second nozzle group in a nozzle switching period during which a first nozzle group that has been used is switched to a second nozzle group that is going to be used; and an adjustment parameter update registration section that updates the adjustment parameter held by the parameter setting section according to the operating condition of the gas turbine and that registers the updated adjustment parameter in the parameter setting section as an adjustment parameter to be used next.

According to the present invention, an advantage is afforded in that a fluctuation in the gas-turbine output in the nozzle switching period can be reduced.

EXPLANATION OF REFERENCE

Figure 1:
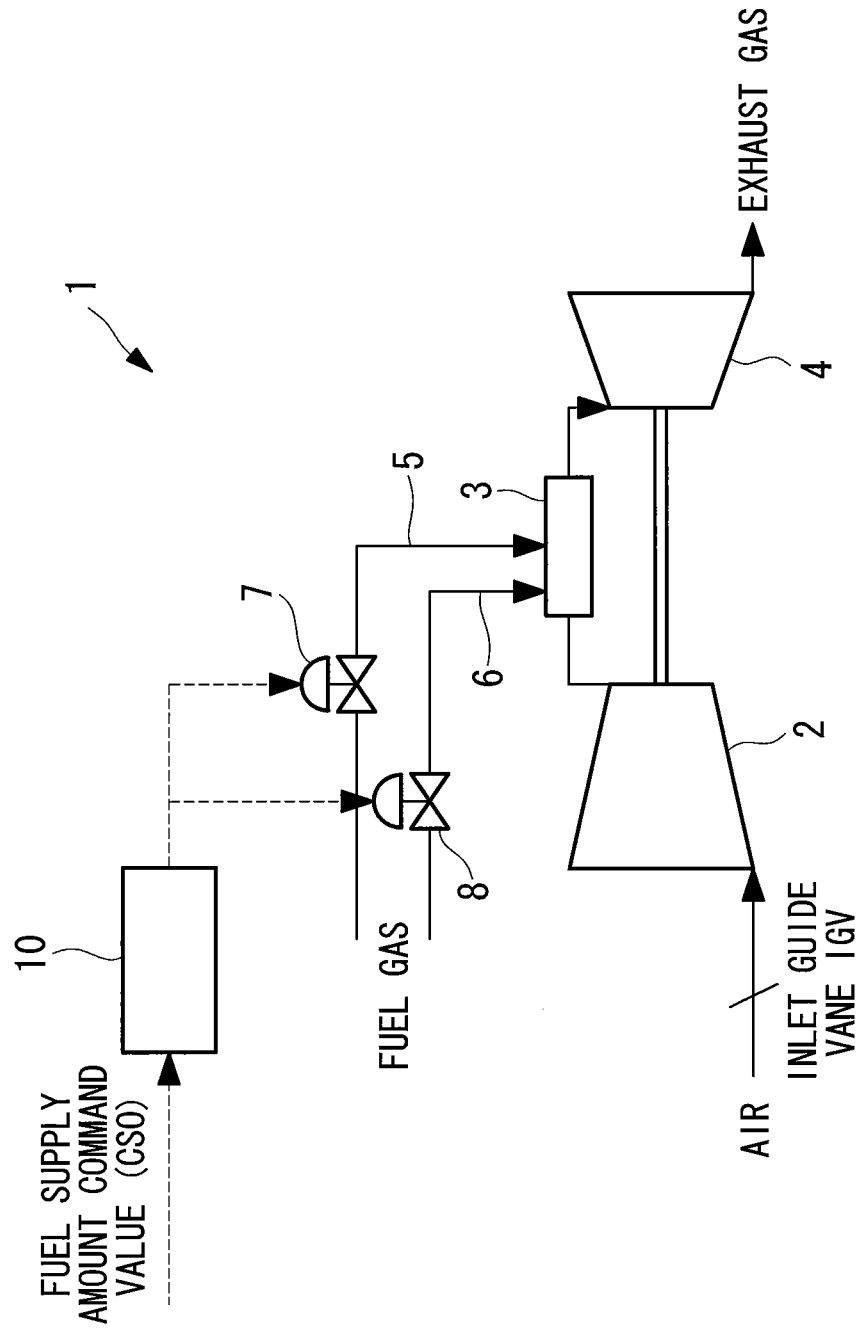
FIG. 1 is a block diagram showing, in outline, the configuration of a gas turbine power generating apparatus according to a first embodiment of the present invention.

1: gas turbine power generating apparatus
2: compressor
3: combustor
4: gas turbine
5: first fuel flow path
6: second fuel flow path
7: first flow-rate adjusting valve
8: second flow-rate adjusting valve
10: gas turbine control device
11: parameter setting section
12: first setting section
13: second setting section
14: fuel control section 15: adjustment parameter update registration section
16: parameter update permission determining section
80: correction section
100: first adjustment section

BEST MODE FOR CARRYING OUT THE INVENTION

A gas turbine control method and a gas turbine power generating apparatus according to embodiments of the present invention will be described below with reference to the drawings.

First Embodiment

FIG. 1 is a block diagram showing, in outline, the configuration of a gas turbine power generating apparatus according to a first embodiment of the present invention.

As shown in FIG. 1, a gas turbine power generating apparatus 1 includes, as main components, a compressor 2 that supplies compressed air, obtained by compressing air, to a combustor 3; the combustor 3 that combusts gasification fuel by using the compressed air supplied from the compressor 2; a gas turbine 4 that rotates when combustion gas supplied from the combustor 3 expands; and a generator (not shown) connected to the gas turbine 4.

Figure 22:
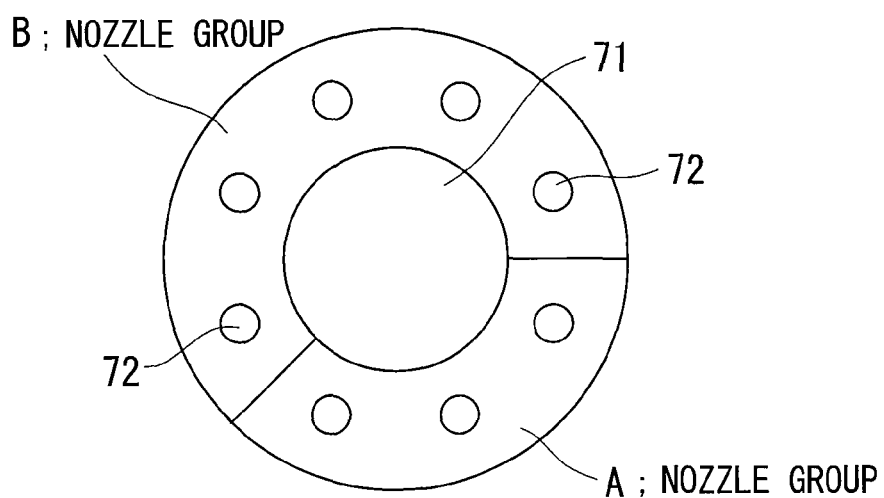
FIG. 22 is a diagram for explaining a pilot nozzle and a plurality of main nozzles.
Figure 23:
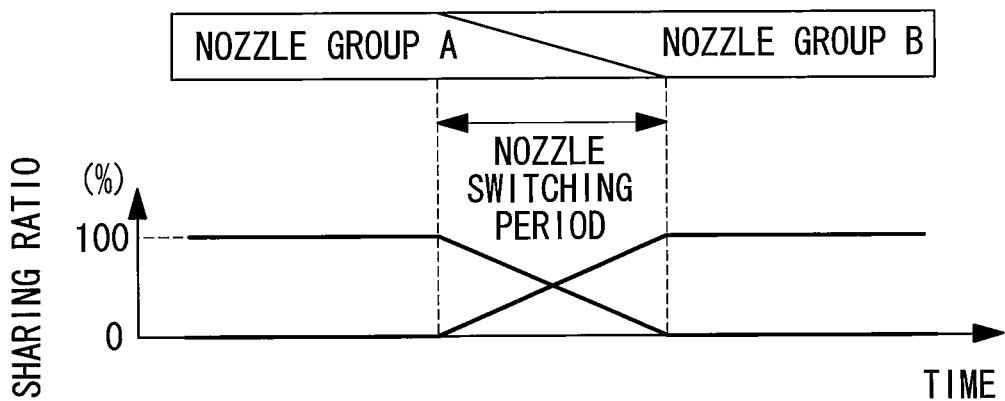
FIG. 23 is a diagram for explaining conventional fuel flow-rate control performed in a nozzle switching period.
Figure 24:
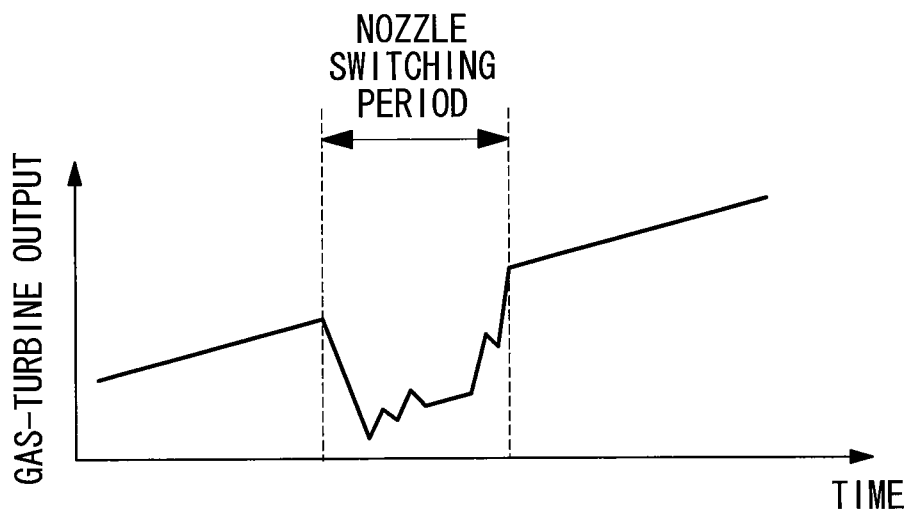
FIG. 24 is a diagram schematically showing a fluctuation in gas-turbine output when the conventional fuel flow-rate control is performed.

As shown in FIG. 22, the combustor 3 is provided with a pilot nozzle 71 and a plurality of main nozzles (nozzles) 72 arranged on the circumference of the pilot nozzle 71 with gaps therebetween. The main nozzles 72 are grouped into a nozzle group A and a nozzle group B. The number of main nozzles 72 constituting the nozzle group A is set smaller than the number of main nozzles 72 constituting the nozzle group B. In this embodiment, the nozzle group A has three main nozzles 72, and the nozzle group B has five main nozzles 72.

Further, a first fuel flow path 5 for supplying fuel gas to the nozzle group A and a second fuel flow path 6 for supplying fuel gas to the nozzle group B are connected to the combustor 3. A first flow-rate adjusting valve 7 and a second flow-rate adjusting valve 8 for adjusting the flow rate of fuel gas are provided in the first fuel flow path 5 and the second fuel flow path 6, respectively. The degrees of opening of the first flow-rate adjusting valve 7 and the second flow-rate adjusting valve 8 are controlled by a gas turbine control device 10. Note that, although a fuel flow path for supplying fuel gas to the pilot nozzle 71 is also naturally provided, it is not shown here.

The gas turbine control device 10 controls the degrees of opening of the above-described first flow-rate adjusting valve 7 and second flow-rate adjusting valve 8 and also controls switching of the nozzle groups A and B used to supply fuel to the combustor 3, depending on the output of the gas turbine. Note that details of the control performed by the gas turbine control device 10 will be described later.

In this gas turbine power generating apparatus 1, compressed air is supplied to the combustor 3 from the compressor 2, and fuel gas is supplied thereto through the nozzle groups A and B etc. The combustor 3 mixes and combusts the supplied compressed air and fuel gas and supplies high-temperature, high-pressure combustion gas to the gas turbine 4. Thus, the gas turbine 4 is rotated by energy generated when the combustion gas expands, and this motive power is transmitted to the generator (not shown), thus generating electric power.

Next, among control operations performed by the gas turbine control device 10, fuel flow-rate control performed in a nozzle switching period will be described with reference to FIG. 2.

Figure 2:
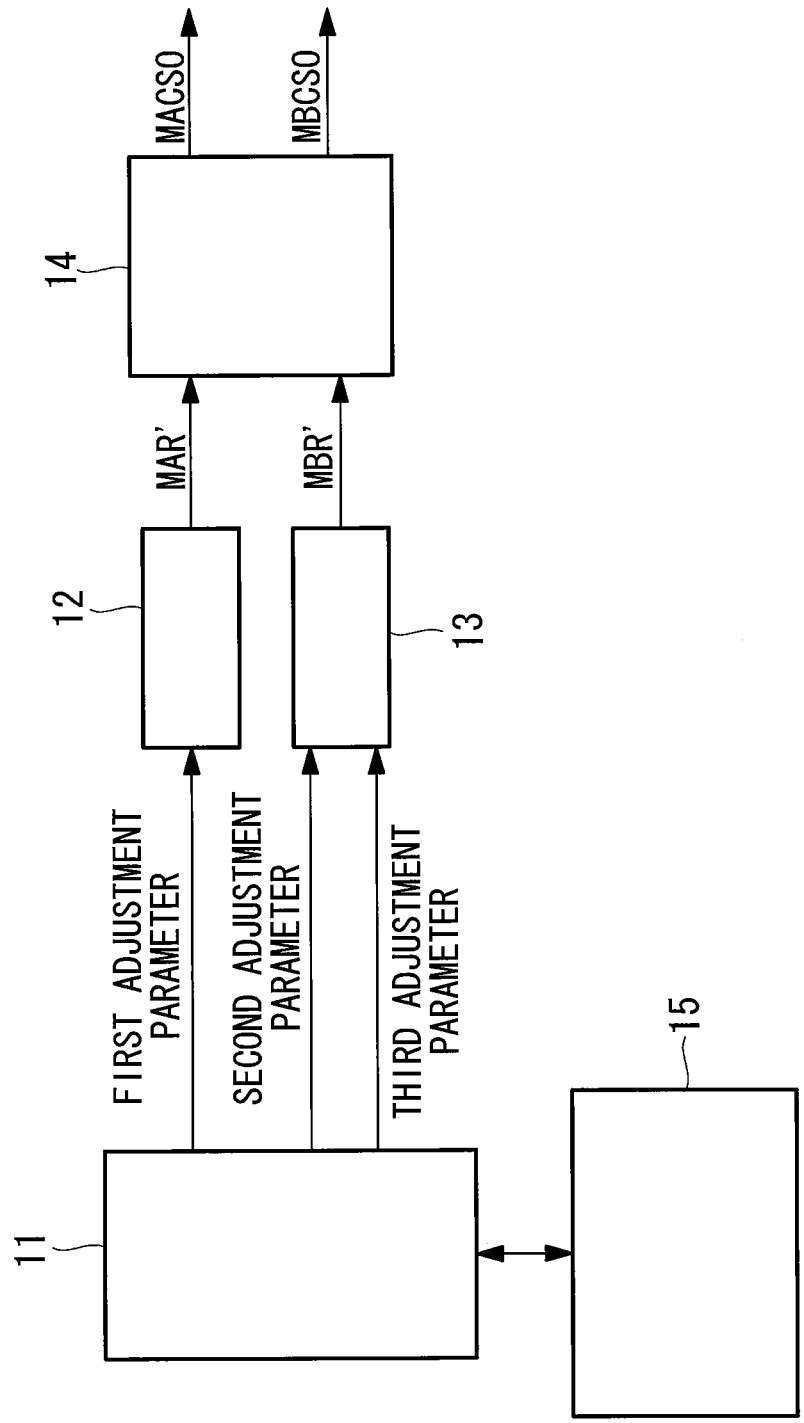
FIG. 2 is a diagram showing an example expanded functional block of functions of a gas turbine control device according to the first embodiment of the present invention.

FIG. 2 is an expanded functional block diagram showing functions of the gas turbine control device 10.

As shown in FIG. 2, the gas turbine control device 10 includes, as main components, a parameter setting section 11, a first setting section 12, a second setting section 13, a fuel control section 14, and a adjustment parameter update registration section 15.

The gas turbine control device 10 has fuel-supply sharing ratios (hereinafter, referred to as "sharing ratios") used in the nozzle switching period. The sharing ratios are each specified for a nozzle group that has been used (hereinafter, referred to as "first nozzle group") and a nozzle group that is going to be used (hereinafter, referred to as "second nozzle group"). The sharing ratio for the first nozzle group is called a first sharing ratio MAR, and the sharing ratio for the second nozzle group is called a second sharing ratio MBR.

For example, in the gas turbine power generating apparatus 1 shown in FIG. 1, when the nozzle group is switched from the nozzle group A to the nozzle group B, the above-described first sharing ratio MAR is used for fuel flow-rate control of the nozzle group A, and the above-described second sharing ratio MBR is used for fuel flow-rate control of the nozzle group B. In contrast, when the nozzles are switched from the nozzle group B to the nozzle group A, the first sharing ratio MAR is used for the nozzle group B, and the second sharing ratio MBR is used for the nozzle group A.

Figure 3:
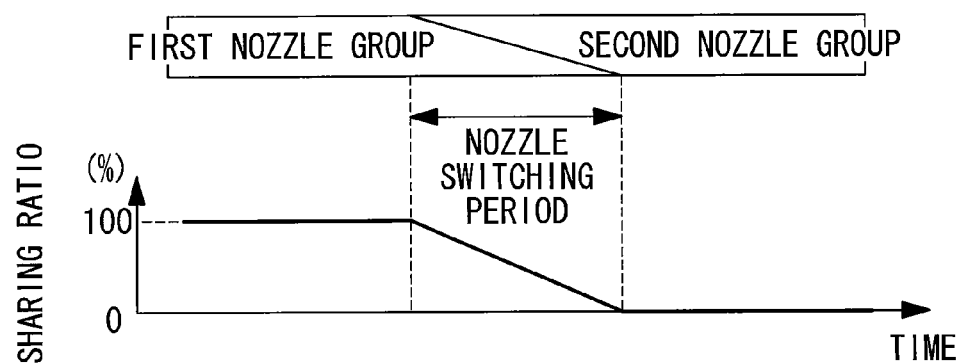
FIG. 3 is a diagram showing one example of a first sharing ratio.
Figure 4:
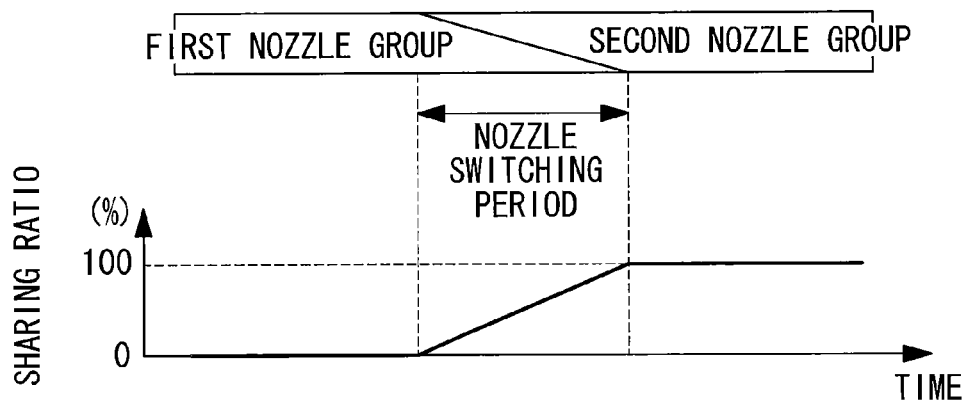
FIG. 4 is a diagram showing one example of a second sharing ratio MBR.

FIG. 3 shows one example of the first sharing ratio MAR, and FIG. 4 shows one example of the second sharing ratio MBR. As shown in FIG. 3, for example, the first sharing ratio MAR is set so as to decrease from 100% to 0% at a constant rate in the nozzle switching period. Further, the second sharing ratio MBR is set so as to increase from 0% to 100% at a constant rate in the nozzle switching period. In this embodiment, the first sharing ratio MAR and the second sharing ratio MBR are set such that the sum of the sharing ratios is constant at 100% at each point in time.

Figure 5:
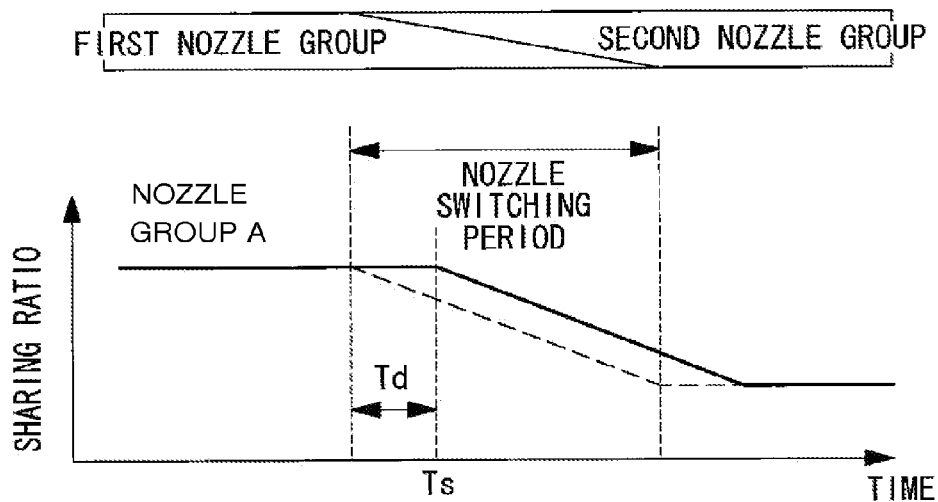
FIG. 5 is a diagram for explaining a first adjustment parameter.
Figure 6:
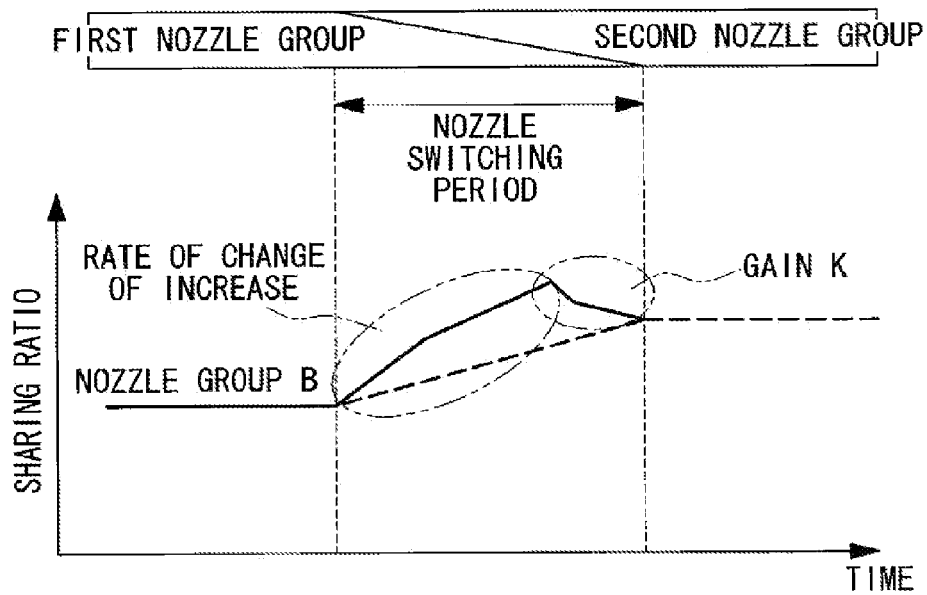
FIG. 6 is a diagram for explaining a second adjustment parameter and a third adjustment parameter.

The parameter setting section 11 holds adjustment parameters for adjusting the first sharing ratio MAR and the second sharing ratio MBR shown in FIG. 3 and FIG. 4. Specifically, the parameter setting section 11 holds a first adjustment parameter used to determine a decrease start timing Ts for the first sharing ratio MAR, as shown in FIG. 5, a second adjustment parameter used to determine a fuel increase amount (gain K) for the second sharing ratio MBR, and a third adjustment parameter used to adjust a rate of change of increase for the second sharing ratio MBR, as shown in FIG. 6.

The above-described first to third adjustment parameters can be updated by the adjustment parameter update registration section 15, to be described later.

When a nozzle switching flag indicating that nozzle switching is being performed is set, the parameter setting section 11 outputs the first adjustment parameter held therein to the first setting section 12 and outputs the second adjustment parameter and the third adjustment parameter held therein to the second setting section 13.

The first setting section 12 corrects the first sharing ratio MAR shown in FIG. 3 based on the first adjustment parameter. Thus, the decrease start timing for the first sharing ratio MAR is delayed by a time period Td corresponding to the first adjustment parameter (see FIG. 5).

Also, the second setting section 13 corrects the second sharing ratio MBR shown in FIG. 4 based on the second adjustment parameter and the third adjustment parameter. Thus, the fuel increase amount (gain K) for the second sharing ratio MBR is corrected based on the second adjustment parameter, and the rate of change of increase therefor is corrected according to the third adjustment parameter (see FIG. 6).

Figure 7:
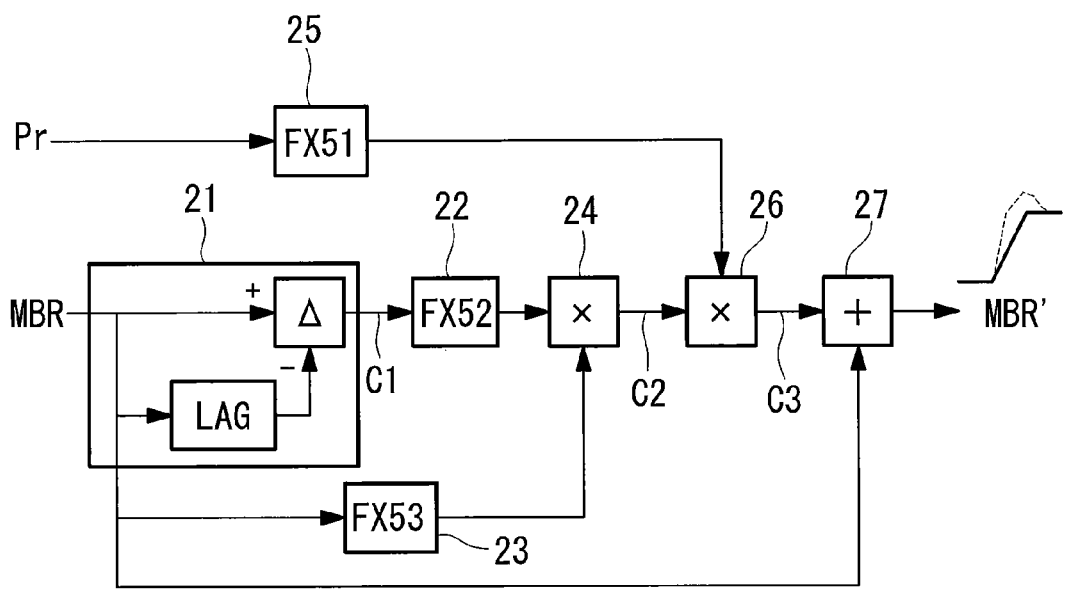
FIG. 7 is a diagram showing one example configuration of a second setting section.

FIG. 7 shows one example configuration of the second setting section 13. As shown in FIG. 7, the second setting section 13 includes, for example, an adjuster (not shown) for adjusting the rate of change of increase and the fuel increase amount for the second sharing ratio MBR shown in FIG. 4 based on the second adjustment parameter and the third adjustment parameter output from the parameter setting section 11; an inexact differential section 21 for calculating the deviation of the second sharing ratio MBR output from the adjuster from a first-order lag thereof; a second function unit 22 for processing an output C1 from the inexact differential section 21 based on a function FX52; a third function unit 23 for processing the second sharing ratio MBR based on a function FX53; a first multiplier 24 for multiplying the output of the second function unit 22 by the output of the third function unit 23; a first function unit 25 for processing a parameter used for operation control of the gas turbine based on a function FX51; a second multiplier 26 for multiplying the output of the first function unit 25 by an output C2 of the first multiplier 24 to generate a correction amount C3; and an adder 27 for adding the correction amount C3 output from the second multiplier 26 to the second sharing ratio MBR to correct the second sharing ratio MBR.

The function FX52 provided in the second function unit 22 and the function FX53 provided in the third function unit 23 are both used for fine tuning a correction amount that cannot be generated in the inexact differential section 21.

Figure 8:
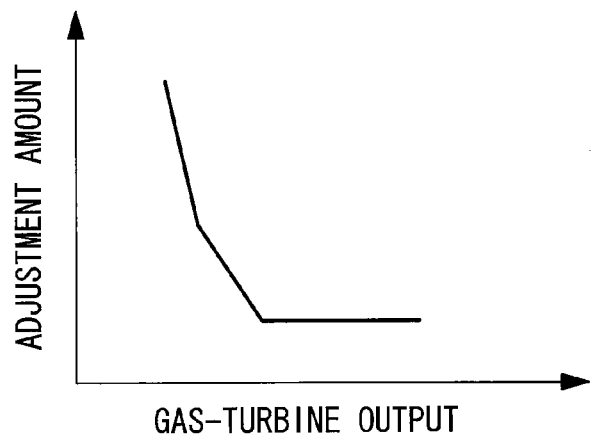
FIG. 8 is a diagram showing one example of a function FX51 provided in a first function unit.

As shown in FIG. 8, the function FX51 provided in the first function unit 25 is set such that a large adjustment amount is output when the output of the gas turbine is low, and a small adjustment amount is output when the output of the gas turbine is high. In other words, it is set such that the lower the output of the gas turbine is, the larger the output adjustment amount is.

Figure 9:
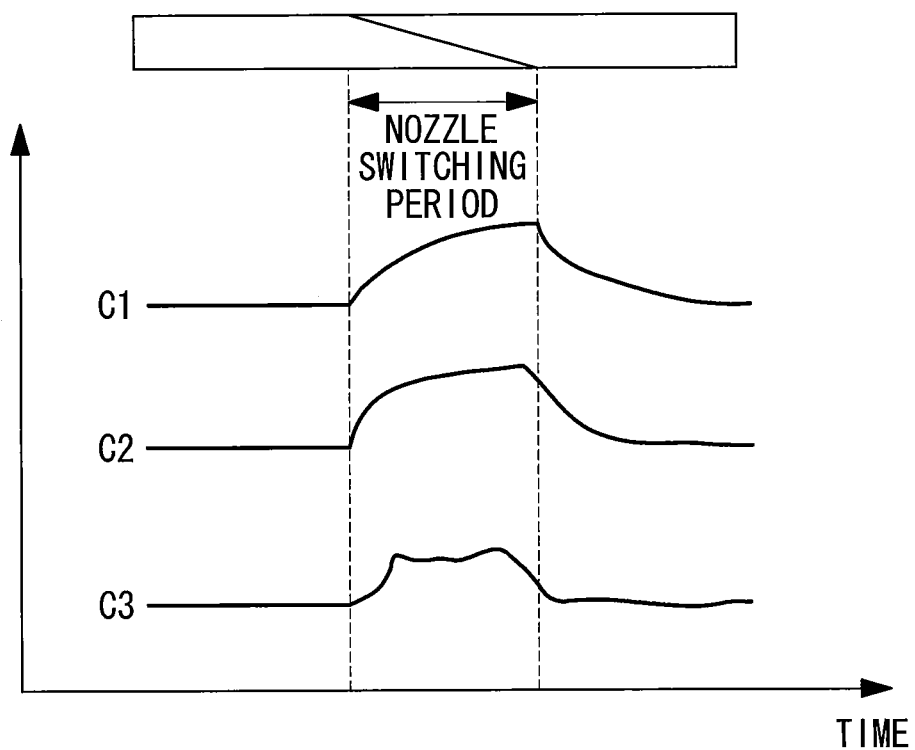
FIG. 9 is a diagram showing examples of an output of an inexact differential section, an output of a first multiplier, and an output of a second multiplier.

FIG. 9 shows examples of the above-described output C1 of the inexact differential section 21, output C2 of the first multiplier 24, and output C3 of the second multiplier 26.

In the thus-configured second setting section 13, the second adjustment parameter and the third adjustment parameter output from the parameter setting section 11 are input to a generating unit (not shown) and used as adjustment amounts for the gain and the rate of change for the second sharing ratio MBR shown in FIG. 4. Thus, for example, the gain K and the rate of change of increase for the second sharing ratio MBR shown in FIG. 4 are adjusted so as to increase as the output or the rotation speed of the gas turbine decreases. The adjusted second sharing ratio MBR is given to the inexact differential section 21.

Note that, instead of the above-described configuration, the second adjustment parameter from the parameter setting section 11 may be given to the first function unit 25, for example. In that case, for example, the first function unit 25 multiplies an adjustment amount obtained by using the above-described function FX51 by the gain K from the parameter setting section 11 to correct the adjustment amount and outputs the corrected adjustment amount to the second multiplier 26.

Figure 25:
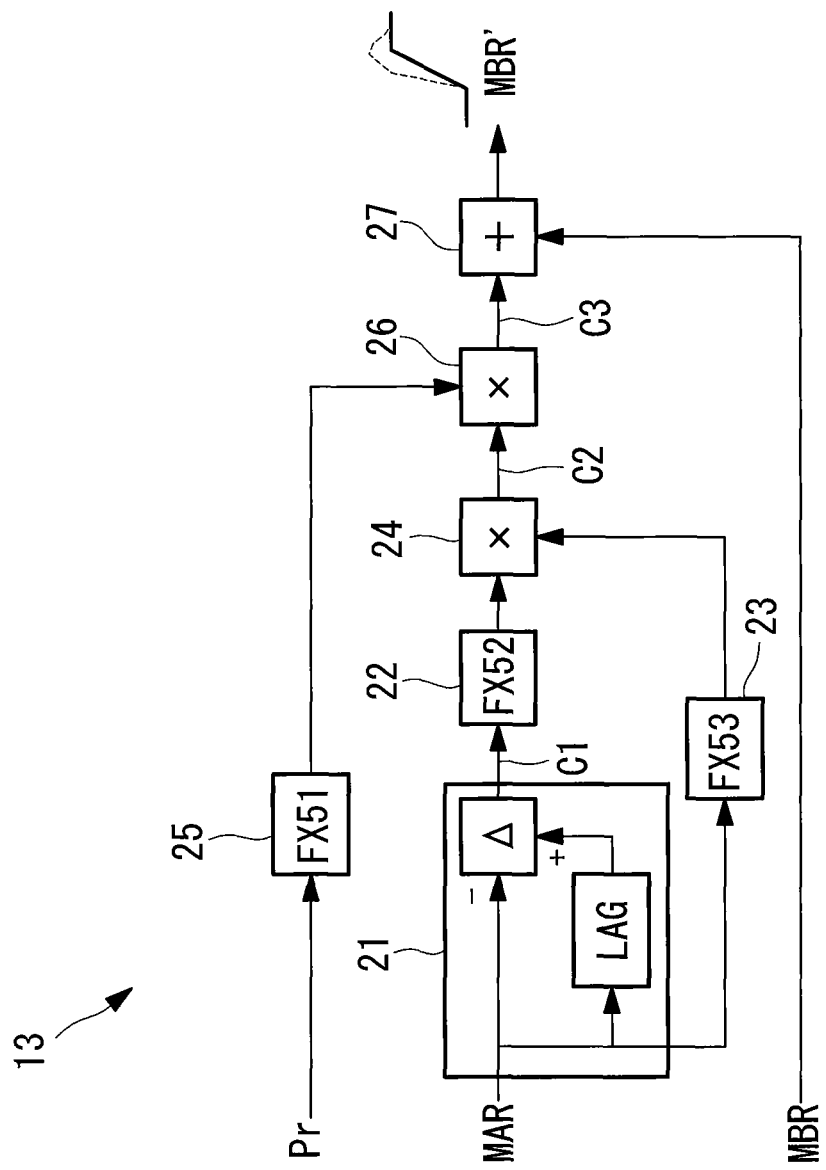
FIG. 25 is a diagram showing another example configuration of the second setting section shown in FIG. 7.

Further, instead of the configuration of the second setting section 13 shown in FIG. 7, the first sharing ratio MAR may be given to the inexact differential section 21 as input information, as shown in FIG. 25. In that case, when the deviation of the first sharing ratio MAR from the first-order lag thereof is calculated, plus and minus are reversed.

Further, in this case, based on the second adjustment parameter and the third adjustment parameter, the generating unit (not shown) may adjust both of the first sharing ratio MAR and the second sharing ratio MBR, or only the second sharing ratio MBR. To adjust the first sharing ratio MAR, for example, the reciprocals of the second adjustment parameter and the third adjustment parameter need to be used.

Referring back to FIG. 2, a first sharing ratio MAR' and a second sharing ratio MBR' that are obtained through the correction of the first setting section 12 and the second setting section 13 are output to the fuel control section 14. The fuel control section 14 multiplies a fuel supply command value CSO by the first sharing ratio MAR', thus setting a first fuel supply command value MACSO for the nozzle group A. The first flow-rate adjusting valve 7 (see FIG. 1) is adjusted according to this first fuel supply command value MACSO, and thus, the amount of fuel supplied to the combustor 3 through the nozzle group A is reduced at a substantially constant rate after a predetermined time period Td has elapsed since the start of nozzle switching.

Further, the fuel control section 14 multiplies the fuel supply command value CSO by the second sharing ratio MBR', thus setting a second combustion supply command value MBCSO for the nozzle group B. The second flow-rate adjusting valve (see FIG. 1) is adjusted according to this second combustion supply command value MBCSO, and thus, the amount of fuel supplied to the combustor 3 through the nozzle group B is gradually increased at a rate of increase for which a second-parameter adjustment amount has been taken into account, since the start of nozzle switching, and an actual fuel supply amount relative to the fuel supply command value CSO is increased by the amount corresponding to a third-parameter adjustment amount.

Then, fuel is supplied through the nozzle group A and the nozzle group B based on the first fuel supply command value MACSO and the second fuel supply command value MBCSO, in which the above-described adjustment parameters are reflected, thereby obtaining the gas-turbine output and the generator output or the gas-turbine rotation speed, corresponding to this fuel supply. The gas-turbine output and the generator output or the gas-turbine rotation speed are sequentially monitored, and the monitoring results are input to the adjustment parameter update registration section 15.

The adjustment parameter update registration section 15 updates the various adjustment parameters that have been used this time, that is, the first to third adjustment parameters currently held by the parameter setting section 11, based on the monitoring results. For this purpose, the adjustment parameter update registration section 15 includes a first adjustment section for adjusting the first adjustment parameter, a second adjustment section for adjusting the second adjustment parameter, and a third adjustment section for adjusting the third adjustment parameter.

Figure 10:
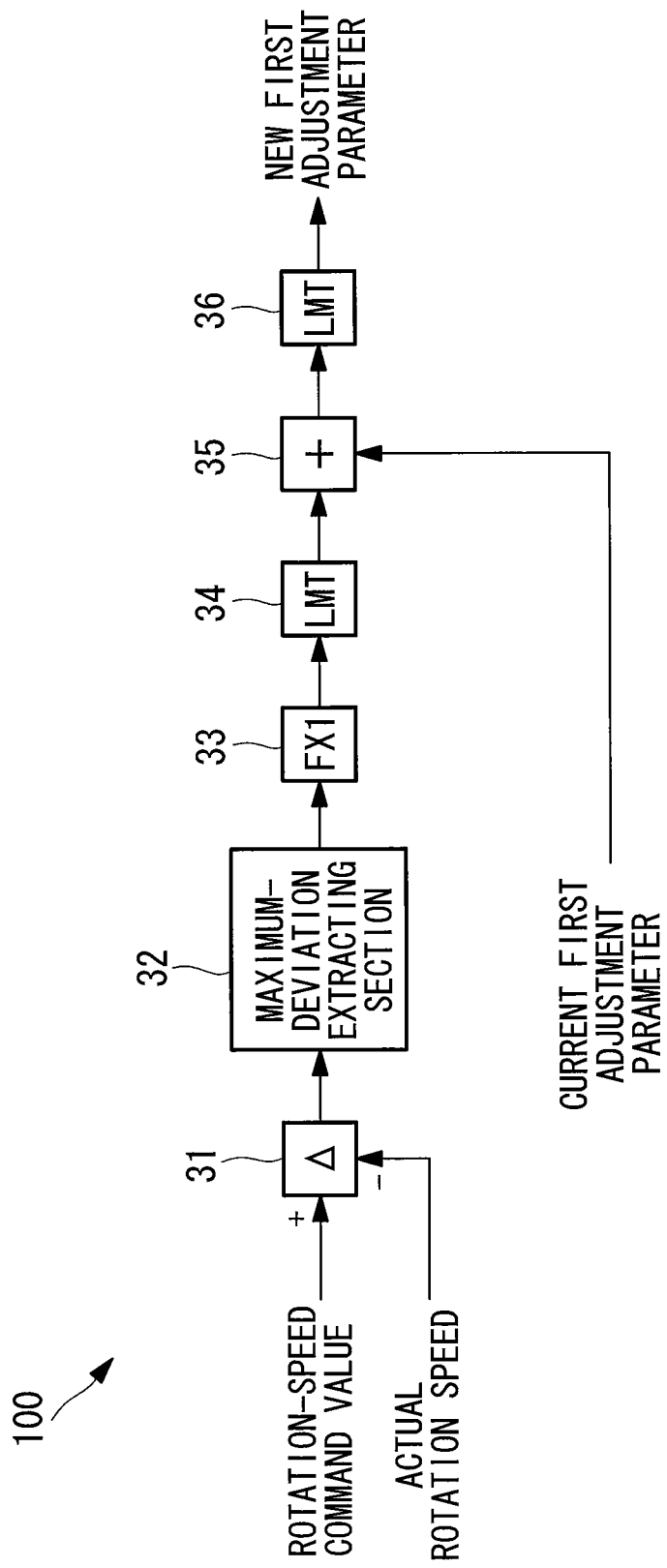
FIG. 10 is a block diagram showing, in outline, the configuration of a first adjustment section included in a parameter update registration section.

FIG. 10 is a block diagram showing, in outline, the configuration of the first adjustment section. As shown in FIG. 10, a first adjustment section 100 includes a deviation calculating section 31 for calculating the deviation of the actual rotation speed from the rotation speed command value at each point in time in the nozzle switching period, a maximum-deviation extracting section 32 for extracting the maximum value of the deviations calculated by the deviation calculating section 31, an adjustment-amount acquiring section 33 for acquiring a delay adjustment time Td for the maximum value of the deviations, from a first adjustment table held in advance, and a first parameter generating section 35 for generating a new first adjustment parameter by adding the delay adjustment time Td acquired by the adjustment-amount acquiring section 33 to the first adjustment parameter currently held by the parameter setting section 11 (see FIG. 2).

Further, in this embodiment, limiters 34 and 36 are provided for respectively limiting the delay adjustment time Td output from the adjustment-amount acquiring section 33 and the new first adjustment parameter output from the first parameter generating section 35 to predetermined upper limits or less.

Figure 11:
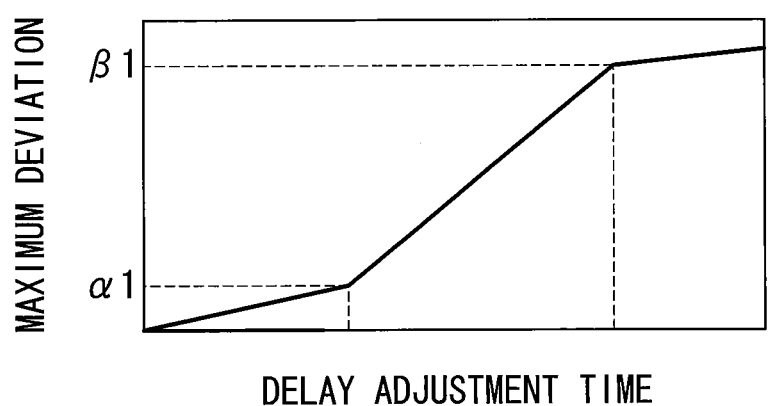
FIG. 11 is a diagram showing one example of a first adjustment table.

FIG. 11 shows one example of the first adjustment table. In FIG. 11, the vertical axis indicates the maximum deviation, and the horizontal axis indicates the delay adjustment time Td. The delay adjustment amount is rapidly increased when the maximum deviation is smaller than $\alpha 1$ or is equal to or larger than $\beta 1$, and the delay adjustment amount is gradually increased when it is equal to or larger than $\alpha 1$ and is smaller than $\beta 1$.

Figure 12:
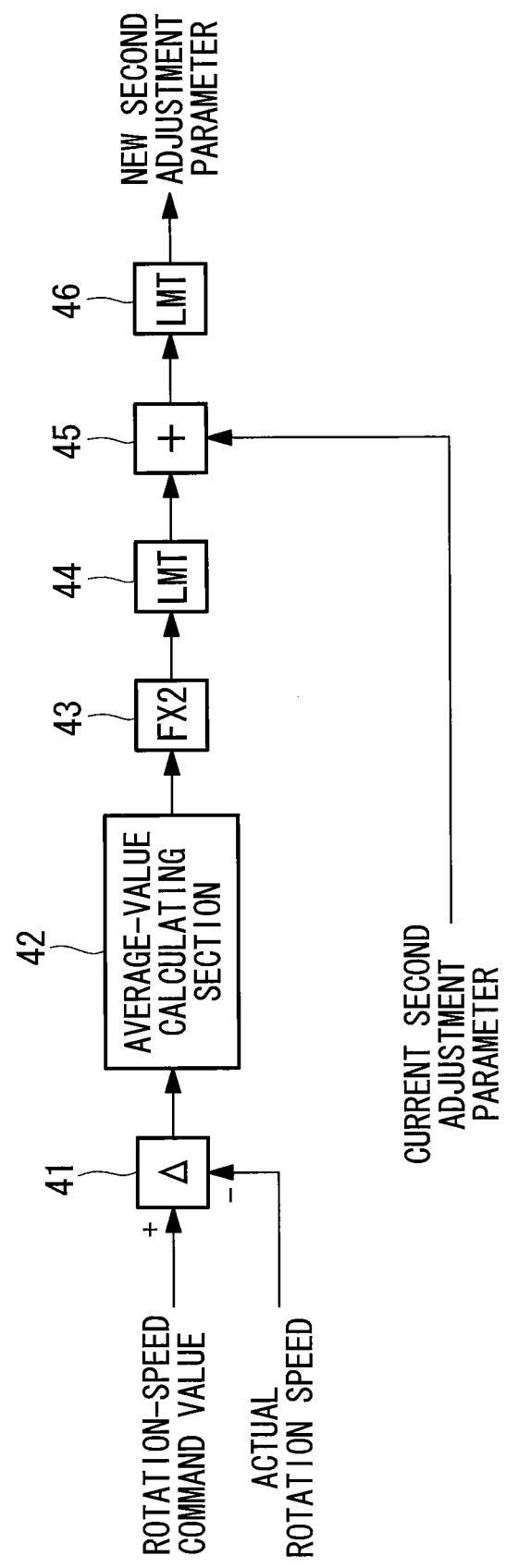
FIG. 12 is a block diagram showing, in outline, the configuration of a second adjustment section included in the parameter update registration section.

As shown in FIG. 12, the second adjustment section includes a deviation calculating section 41 for calculating the deviation of the actual rotation speed from the rotation speed command value at each point in time in the nozzle switching period, an average-value calculating section 42 for calculating the average value of the deviations in the nozzle switching period, an adjustment-amount acquiring section 43 for acquiring a fuel increase amount for the average value of the deviations, from a second adjustment table held in advance, and a second parameter generating section 45 for generating a new second adjustment parameter by adding the fuel increase amount acquired by the adjustment-amount acquiring section 43 to the second adjustment parameter currently held by the parameter setting section 11 (see FIG. 2).

Further, in this embodiment, limiters 44 and 46 are provided for respectively limiting the fuel increase amount (gain K) output from the adjustment-amount acquiring section 43 and the new second adjustment parameter output from the second parameter generating section 45 to predetermined upper limits or less.

Figure 13:
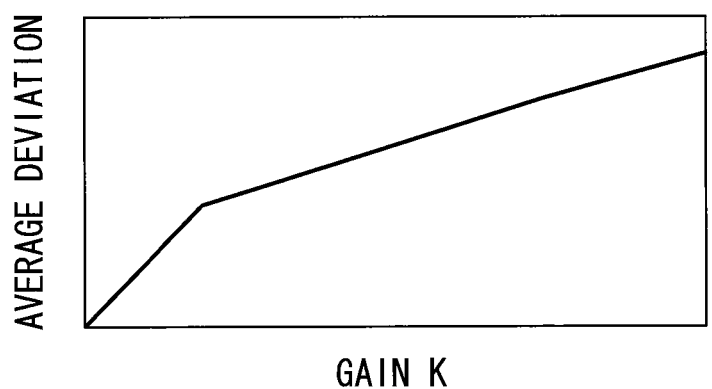
FIG. 13 is a diagram showing one example of a second adjustment table.

FIG. 13 shows one example of the second adjustment table. In FIG. 13, the vertical axis indicates the average deviation, and the horizontal axis indicates the fuel increase amount (gain K). The fuel increase amount (gain K) is increased substantially linearly with respect to the average deviation.

Figure 14:
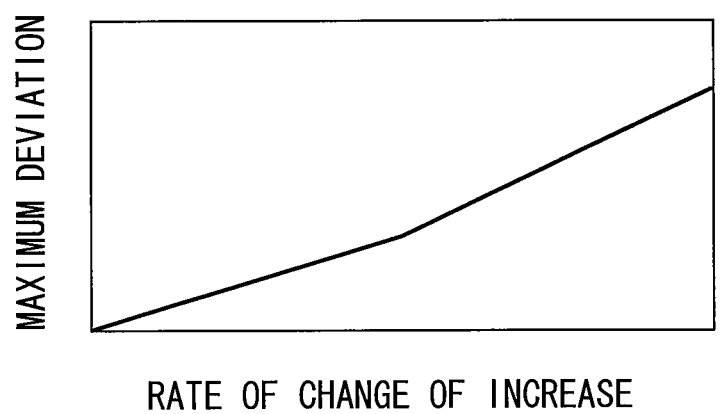
FIG. 14 is a diagram showing one example of a third adjustment table.

The third adjustment section has substantially the same configuration as the first adjustment section 100 shown in FIG. 10 and has, instead of the first parameter generating section 35, a third parameter generating section for acquiring a rate of change of increase for the maximum deviation by using a third adjustment table. FIG. 14 shows one example of the third adjustment table. In FIG. 14, the vertical axis indicates the maximum deviation, and the horizontal axis indicates the rate of change of increase. The rate of change of increase is increased substantially linearly with respect to the maximum deviation.

When the first to third adjustment parameters are generated in the first to third adjustment sections, the adjustment parameter update registration section 15 (see FIG. 2) updates the current first to third adjustment parameters held by the parameter setting section 11 to the newly-generated first to third adjustment parameters. Thus, every time nozzle switching is performed, the various adjustment parameters held by the parameter setting section 11 are updated based on the behavior of the gas-turbine rotation speed at that time. Then, at the next nozzle switching, the latest first to third adjustment parameters updated by the adjustment parameter update registration section 15 are set by the parameter setting section 11 and are output to the first setting section 12 and the second setting section 13.

As described above, according to the gas turbine control method and the gas turbine power generating apparatus of this embodiment, since the adjustment parameters held by the parameter setting section 11 are updated each time based on the operating condition (for example, rotation speed behavior or output behavior) of the gas turbine in the nozzle switching period, it is possible to gradually bring the adjustment parameters close to the optimum values. As a result, it is possible to gradually bring the amount of fuel supplied to the combustor 3 close to an ideal value and to reduce a fluctuation in the gas-turbine output or the gas-turbine rotation speed in the nozzle switching period.

Second Embodiment

Next, a gas turbine control method and a gas turbine power generating apparatus according to a second embodiment of the present invention will be described.

Figure 15:
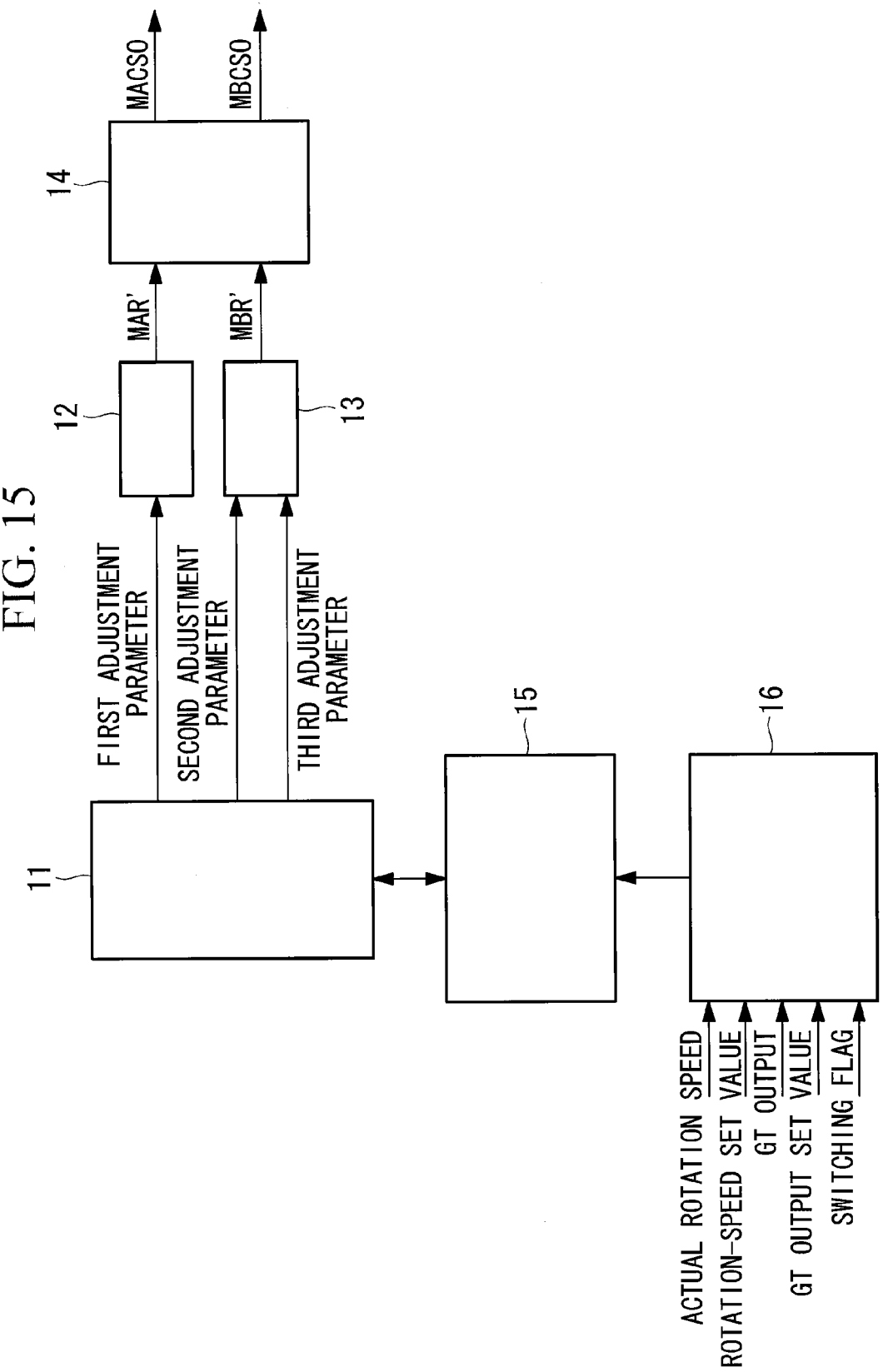
FIG. 15 is a diagram showing an example expanded functional block of functions of a gas turbine control device according to a second embodiment of the present invention.

In the above-described first embodiment, the adjustment parameters held by the parameter setting section 11 are updated every time nozzle switching is performed; however, in this embodiment, as shown in FIG. 15, a parameter update permission determining section 16 that determines whether to update the adjustment parameters held by the parameter setting section 11 based on at least one of information about the gas-turbine output and information about the gas-turbine rotation speed is provided.

Specifically, as shown in FIG. 15, the parameter update permission determining section 16 receives, as input information, the actual gas-turbine rotation speed, the gas-turbine rotation speed command value, the gas-turbine output, the gas-turbine output command value, and the switching flag. The parameter update permission determining section 16, for example, calculates the deviation of the actual gas-turbine rotation speed from the gas-turbine rotation speed command value, determines that update registration of the adjustment parameters held by the parameter setting section 11 is permitted when this deviation is equal to or greater than a predetermined threshold, and outputs an update permission signal to the adjustment parameter update registration section 15. Upon reception of this signal, the adjustment parameter update registration section 15 performs update registration of the adjustment parameters held in the parameter setting section 11.

Note that, instead of the above-described determination, the parameter update permission determining section 16 may calculate the deviation of the actual gas-turbine output from the gas-turbine output command value, for example, and permit update registration of the adjustment parameters held by the parameter setting section 11 when this deviation is equal to or greater than a predetermined threshold. Alternatively, update registration may be permitted when both deviations are equal to or greater than the predetermined thresholds.

In this way, when the gas turbine is ideally operated, update registration of the adjustment parameters is not performed, thus making it possible to avoid unnecessary update registration of the adjustment parameters.

Third Embodiment

Next, a gas turbine control method and a gas turbine power generating apparatus according to a third embodiment of the present invention will be described.

In this embodiment, the nozzle switching period is divided into a plurality of time periods according to the properties of the adjustment parameters, and each of the adjustment parameters is allocated to a time period during which the adjustment parameter functions most effectively. Then, the corresponding adjustment parameter is updated according to the behavior of the gas turbine in the time period to which it is allocated.

Figure 16:
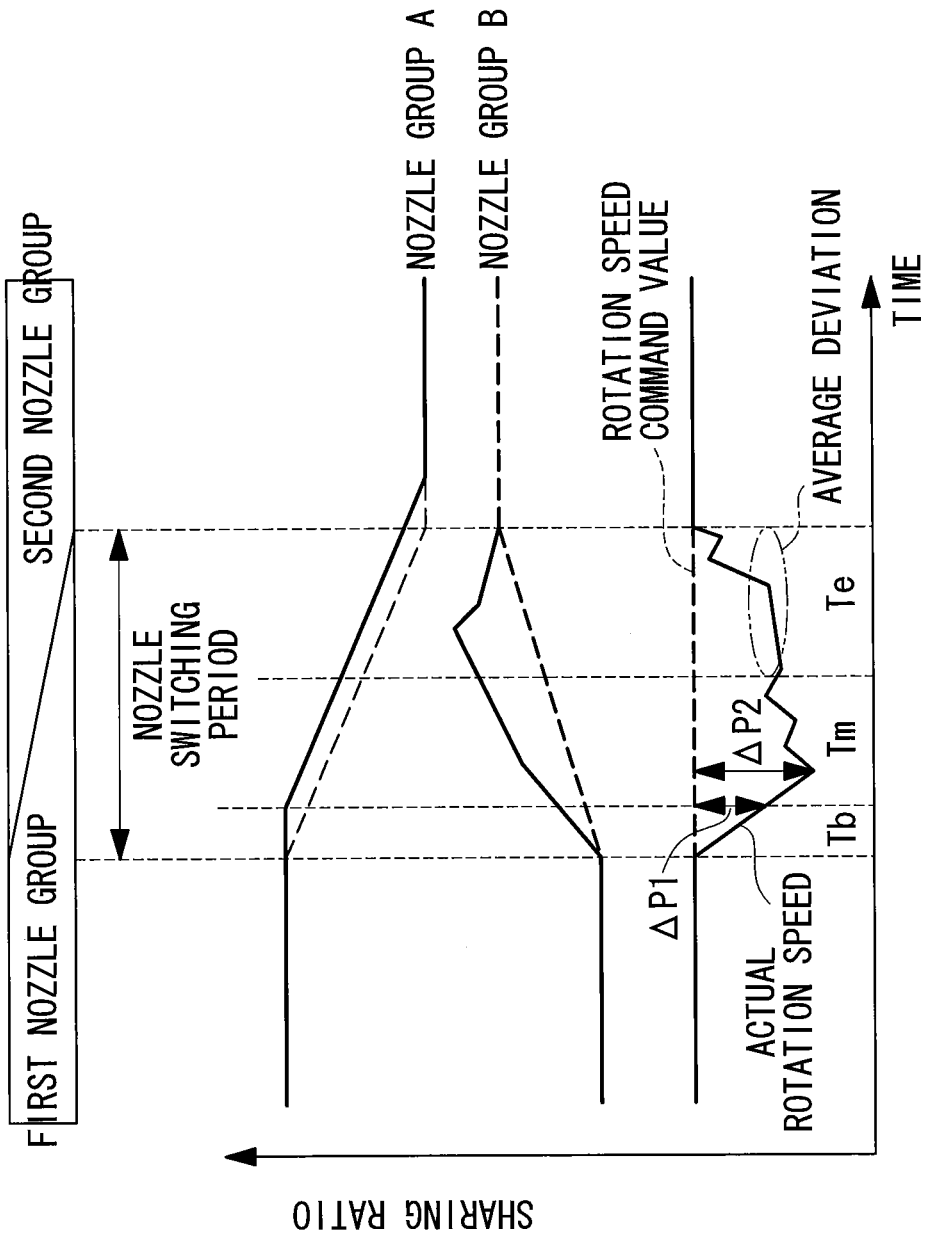
FIG. 16 is a diagram for explaining a gas turbine control method according to a third embodiment of the present invention.

In this embodiment, as shown in FIG. 16, the nozzle switching period is divided into three time periods, i.e., a beginning time period Tb, a middle time period Tm, and an end time period Te; and the first adjustment parameter is allocated to the beginning time period Tb, the third adjustment parameter is allocated to the middle time period (Tm), and the second adjustment parameter is allocated to the end time period (Te). Then, the maximum deviation or the average deviation is calculated in the respective time periods, and the respective adjustment parameters are updated based on the calculated values.

Specifically, a first adjustment parameter corresponding to a maximum deviation $\Delta P1$ of the actual gas-turbine rotation speed in the beginning time period Tb of the nozzle switching period from the rotation speed command value is calculated by the above-described first adjustment section 100. Similarly, a second adjustment parameter corresponding to an average deviation of the actual gas-turbine rotation speed in the end time period Te of the nozzle switching period from the rotation speed command value is calculated by the above-described second adjustment section. Also, a third adjustment parameter corresponding to a maximum deviation $\Delta P2$ of the actual gas-turbine rotation speed in the middle time period Tm of the nozzle switching period from the rotation speed command value is calculated by the above-described third adjustment section.

In this way, since each of the adjustment parameters is updated according to the behavior of the gas turbine in the time period during which fuel amount adjustment using the adjustment parameter functions effectively, the adjustment parameter can be updated to a more appropriate value.

Fourth Embodiment

Next, a gas turbine control method and a gas turbine power generating apparatus according to a fourth embodiment of the present invention will be described.

In the gas turbine control method and the gas turbine power generating apparatus according to this embodiment, the adjustment parameters are updated based on the gas-turbine rotation speed; however, in this embodiment, the adjustment parameters are corrected according to a parameter other than the gas-turbine rotation speed, for example, the atmospheric conditions.

Figure 17:
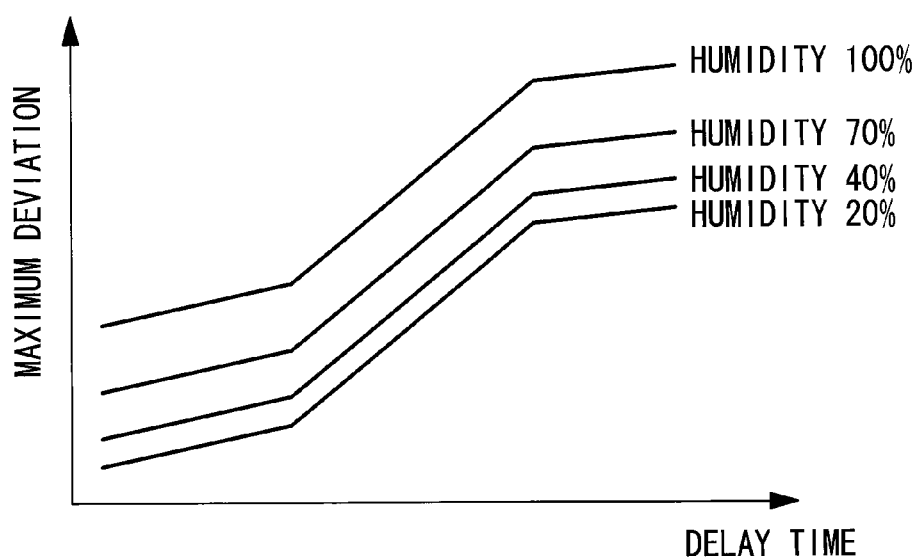
FIG. 17 is a diagram showing one example of the first adjustment table in view of various atmospheric conditions.

For example, a description will be given of the first adjustment parameter as an example. As shown in FIG. 17, the first adjustment table is provided according to atmospheric conditions (in this embodiment, humidity). The first parameter generating section 35 (see FIG. 10) of the first adjustment section 100 in the adjustment parameter update registration section 15 uses the first adjustment table corresponding to the atmospheric condition at the time of nozzle switching to acquire a corresponding first adjustment parameter. Also, the second and third adjustment parameters are similarly acquired.

As described above, when the adjustment parameters are determined with the atmospheric condition being taken into account, the operation control of the gas turbine can be made more stable.

Figure 18:
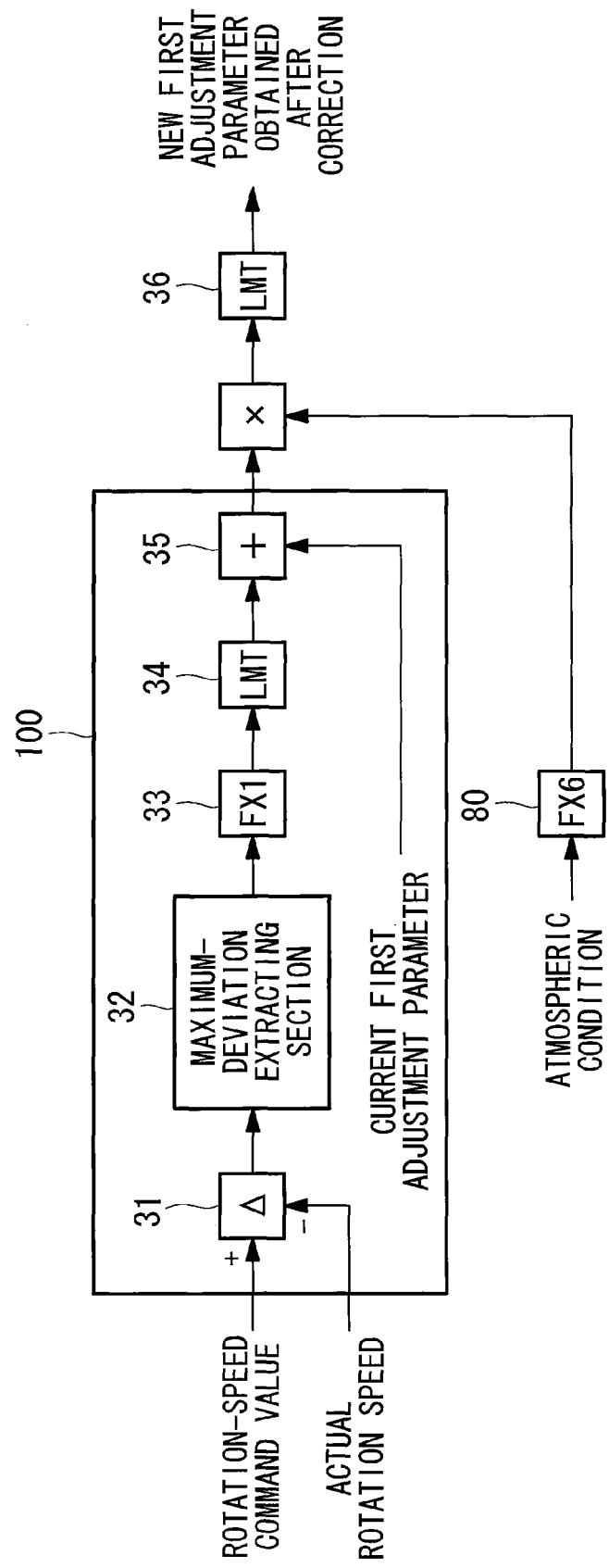
FIG. 18 is a diagram showing one example configuration for correcting the first adjustment parameter according to the atmospheric conditions.

Note that, instead of the above-described embodiment in which the adjustment table to be referred to is switched, a configuration may be used in which a correction section 80 that calculates a correction coefficient appropriate for the atmospheric conditions is further provided, as shown in FIG. 18, and a new first adjustment parameter determined by the first adjustment section 100 is multiplied by the correction coefficient calculated by the correction section 80, thereby correcting the new first adjustment parameter according to the atmospheric conditions.

For example, the correction section 80 holds a table or an arithmetic expression in which atmospheric conditions are associated with correction coefficients and calculates a correction coefficient corresponding to the atmospheric conditions observed at the time of nozzle switching based on the table or the arithmetic expression. Also, the second and third adjustment parameters are similarly calculated.

Modification 1

In the above-described embodiments, the adjustment parameters are determined based on the maximum deviation of the actual gas-turbine rotation speed in the nozzle switching period from the rotation speed command value or based on the average deviation thereof; however, instead of this configuration, the adjustment parameters may be determined based on the integral value of the deviation of the actual gas-turbine rotation speed from the rotation speed command value, the maximum deviation of the actual gas-turbine output from the output command value, or the integral value of the deviation of the actual gas-turbine output from the output command value.

Modification 2

In the above-described fourth embodiment, a description has been given of humidity as an example of the atmospheric conditions; however, instead of humidity, the adjustment parameters may be determined or corrected based on the temperature, for example. Further, instead of the atmospheric conditions, the adjustment parameters may be determined or corrected in view of start-up conditions, power-plant operating conditions, or power-plant operational states, for example. Furthermore, the first to third adjustment parameters may be determined or corrected in view of all of them.

Examples of the above-described start-up conditions include cold starting, hot starting, etc. Further, examples of the power-plant operating conditions include the fuel gas calorific value, the fuel gas calorific value variation, the fuel gas temperature, the degree of opening of an IGV valve, etc. The degree of opening of an IGV valve means the degree of opening of an IGV valve that is provided at the inlet of the compressor 2 (see FIG. 1) to adjust the bleed airflow for the compressor 2. Further, examples of the power-plant operational state include accumulated plant-operation time etc.

Figure 19:
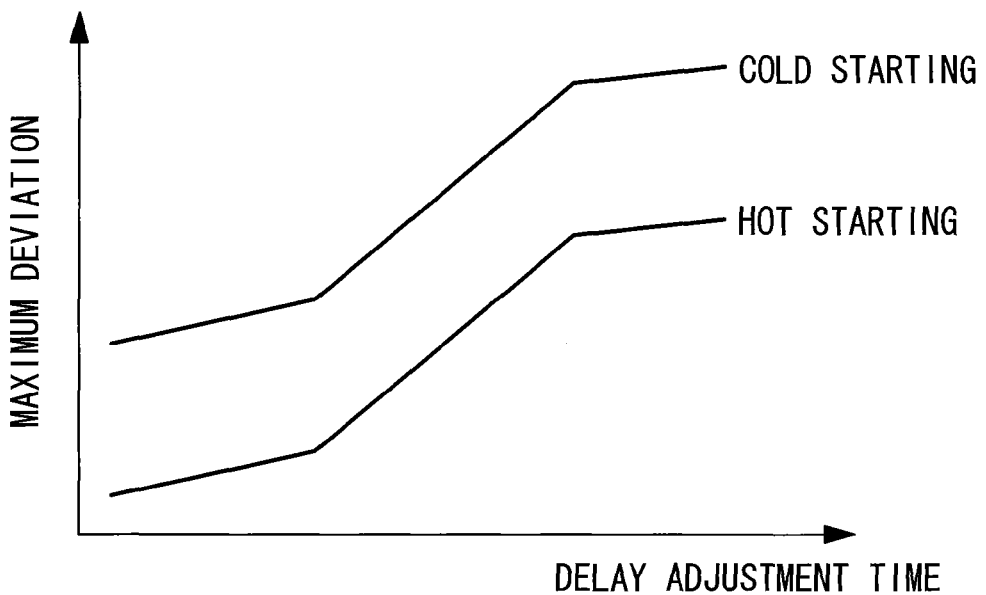
FIG. 19 is a diagram showing one example of the first adjustment table in view of start-up conditions.

FIG. 19 shows the first adjustment table according to the start-up conditions, for example. As shown in this figure, the delay adjustment time for cold starting is set larger than that for hot starting. This is because the fuel gas combustion efficiency is lower when the temperature is low, thus requiring the supply of more fuel in order to provide the same output.

Figure 20:
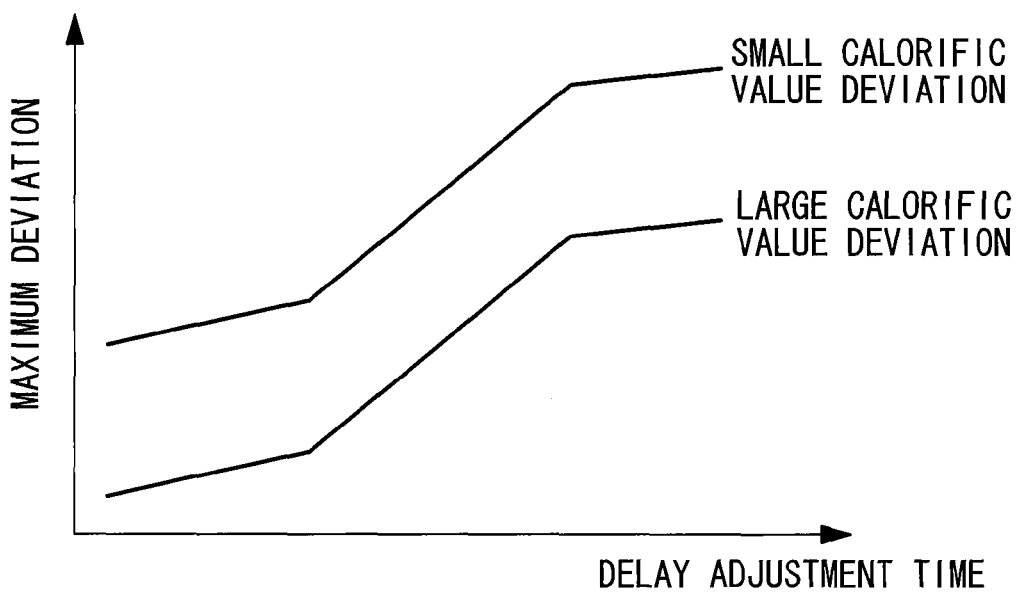
FIG. 20 is a diagram showing one example of the first adjustment table in view of the calorific value of fuel gas as a plant operating condition.
Figure 21:
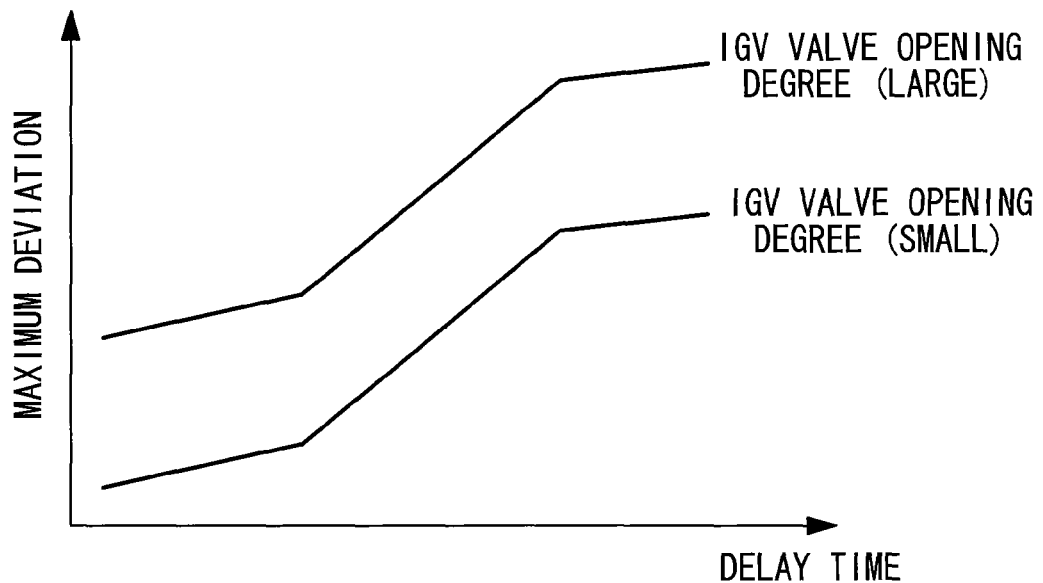
FIG. 21 is a diagram showing one example of the first adjustment table in view of the degree of opening of an IGV valve as the plant operating condition.

FIGS. 20 and 21 show first adjustment tables according to power-plant operating conditions. FIG. 20 shows the first adjustment table according to the calorific value of the fuel gas supplied to the combustor 3, and FIG. 21 shows the first adjustment table according to the degree of opening of the IGV valve provided at the inlet of the compressor 2.

In FIG. 20, the delay adjustment time is set larger when the calorific value of the fuel gas is lower. This is because the combustion efficiency is reduced when the calorific value is lower.

In FIG. 21, the delay adjustment time is set larger when the degree of opening of the IGV valve is larger. This is because more compressed air is supplied from the compressor 2 to the combustor 3 when the degree of opening of the IGV valve is increased, and thus, more fuel is supplied accordingly.

As described above, when the adjustment parameters are corrected in view of a measurable factor having a high rate of change, it is possible to realize nozzle switching control using more appropriate adjustment parameters.

Modification 3

In the above-described embodiments, a description has been given of a case in which the nozzle group A, having three nozzles, is switched to the nozzle group B, having five nozzles; however, nozzle switching is generally performed in multiple stages, instead of only one stage. For example, after switching to the nozzle group B, having five nozzles, nozzle switching is further performed to a nozzle group C having eight nozzles (not shown). In this next-stage nozzle switching, the adjustment parameters that have been used for the previous nozzle switching may be used. In this way, when the latest adjustment parameters that have been updated in the latest nozzle switching are used for nozzle switching in a different stage, the output of the gas turbine can be made more stable.

The invention claimed is:

1. A gas turbine control method for a gas turbine that includes a combustor and a plurality of nozzle groups grouped into a first main nozzle group and a second main nozzle group so as to be arranged on the circumference of a pilot nozzle, each of the first main nozzle group and the second main nozzle group having different numbers of main nozzles and supplying fuel gas to the combustor, and that switches the first main nozzle group and the second main nozzle group used for fuel supply according to an operating condition, the method comprising the steps of:

receiving the operating condition from the gas turbine and calculating at least a first adjustment parameter, a second adjustment parameter and a third adjustment parameter from the operating condition;

registering in advance at least the first adjustment parameter selected from a fuel-supply sharing ratio of the first main nozzle group with respect to a fuel supply command value, at least the second adjustment parameter selected from a fuel-supply sharing ratio of the second main nozzle group with respect to the fuel supply command value, and at least the third adjustment parameter selected so as to adjust at least one of the fuel-supply sharing ratio of the first main nozzle group and the fuel-supply sharing ratio of the second main nozzle group in a main nozzle group switching period, during which the first main nozzle group that has been used is switched to the second main nozzle group that is going to be used;

determining a fuel supply command value of the first main nozzle group and a fuel supply command value of the second main nozzle group during the main nozzle group switching period using the fuel-supply sharing ratio of the first main nozzle group, the fuel-supply sharing ratio of the second main nozzle group, and the first, second and third adjustment parameters;

updating the first, second and third adjustment parameters registered in advance, according to the operating condition of the gas turbine in which a fuel control based on the determined fuel supply command value of the first main nozzle group and the fuel supply command value of the second main nozzle group are reflected; and registering the updated adjustment parameters as adjustment parameters to be used next.

2. A gas turbine control method for a gas turbine according to claim 1, wherein, at least the first, second and third adjustment parameters adjust at least one of the fuel-supply sharing ratio of the first main nozzle group and the fuel-supply sharing ratio of the second main nozzle group so that a total amount of the fuel supply command value of the first main nozzle group and the fuel supply command value of the second main nozzle group are larger than the fuel supply command value.

3. A gas turbine control method for a gas turbine according to claim 1, wherein at least the first, second and third adjustment parameters are updated based on information about a gas-turbine output or a gas-turbine rotation speed.

4. A gas turbine control method for a gas turbine according to claim 1, wherein whether to permit update of the first, second and third adjustment parameters is determined based on the operating condition of the gas turbine, and update registration of the first, second and third adjustment parameters is performed based on the determination result.

5. A gas turbine control method for a gas turbine according to claim 1, wherein one of the first, second and third adjustment parameters that is used to determine a decrease start timing of the fuel supply command value of the first main nozzle group in the nozzle switching period.

6. A gas turbine control method for a gas turbine according to claim 1, wherein one of the first, second and third adjustment parameters is used to determine a rate of increase for at least one of the fuel supply command value of the first nozzle group and the fuel supply command value of the second nozzle group.

7. A gas turbine control method for a gas turbine according to claim 1, wherein one of the first, second and third adjustment parameters is used to determine at least one of a rate of change of increase for the fuel supply command value of the second nozzle group and a rate of change of decrease for the fuel supply command value of the first nozzle group.

8. A gas turbine control method for a gas turbine according to claim 1, wherein, when there are a plurality of adjustment parameters, the nozzle switching period is divided into a plurality of time periods according to the properties of at least the first, second and third adjustment parameters, at least the first, second and third adjustment parameters are respectively allocated to the time periods, and at least each of the first, second and third adjustment parameters is updated according to the operating condition of the gas turbine in the time period to which it is allocated.

9. A gas turbine control method for a gas turbine according to claim 1, wherein at least the first, second and third adjustment parameters are updated based on at least one of atmospheric conditions, start-up conditions, power-plant operating conditions, and power-plant operational states, in the nozzle switching period, and the updated adjustment parameters are registered as the adjustment parameters to be used next.

10. A gas turbine power generating apparatus that includes a combustor and a plurality of nozzle groups grouped into a first main nozzle group and a second main nozzle group so as to be arranged on the circumference of a pilot nozzle, and the each of the first main nozzle group and the second main nozzle group having different numbers of main nozzles and supplying fuel gas to the combustor and that switches the first main nozzle group and the second main nozzle group used for fuel supply according to an operating condition, comprising:

a parameter setting section that receives the operating condition from the gas turbine and calculates at least a first, second and third adjustment parameters from the operating condition; said parameter setting section adjusts at least the first adjustment parameter selected from a fuel-supply sharing ratio of the first main nozzle group with respect to a fuel supply command value, at least the second adjustment parameter from a fuel-supply sharing ratio of the second main nozzle group with respect to the fuel supply command value, and at least the third adjustment parameter selected so as to adjust at least one of the fuel-supply sharing ratio of the first main nozzle group and the fuel-supply sharing ratio of the second main nozzle group in a main nozzle group switching period during which a first main nozzle group that has been used is switched to a second main nozzle group that is going to be used;

a determining section for determining a fuel supply command value of the first main nozzle group and a fuel supply command value of the second main nozzle group during the main nozzle group switching period using the fuel-supply sharing ratio of the first main nozzle group, the fuel-supply sharing ratio of the second main nozzle group, and at least the first, second and third adjustment parameters; and an adjustment parameter update registration section that updates at least the first, second and third adjustment parameters according to the operating condition of the gas turbine in which a fuel control based on the determined fuel supply command value of the first main nozzle group and the fuel supply command value of the second main nozzle group are reflected, and that registers the updated adjustment parameters in the parameter setting section as adjustment parameters to be used next, wherein the gas turbine power generating apparatus allows a fluctuation in output of the gas turbine to be reduced.

* * * * *